US008635060B2

(12) United States Patent
Seo et al.

(10) Patent No.: US 8,635,060 B2
(45) Date of Patent: Jan. 21, 2014

(54) FOREIGN LANGUAGE WRITING SERVICE METHOD AND SYSTEM

(75) Inventors: Young Ae Seo, Daejeon (KR); Chang Hyun Kim, Daejeon (KR); Seong Il Yang, Daejeon (KR); Jinxia Huang, Daejeon (KR); Sung Kwon Choi, Daejeon (KR); Ki Young Lee, Daejeon (KR); Yoon Hyung Roh, Daejeon (KR); Oh Woog Kwon, Daejeon (KR); Yun Jin, Daejeon (KR); Ying Shun Wu, Daejeon (KR); Eun Jin Park, Daejeon (KR); Young Kil Kim, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 213 days.

(21) Appl. No.: 12/825,643

(22) Filed: Jun. 29, 2010

(65) Prior Publication Data
US 2011/0144974 A1    Jun. 16, 2011

(30) Foreign Application Priority Data

Dec. 11, 2009   (KR) .................... 10-2009-0123135

(51) Int. Cl.
  *G06F 17/28*   (2006.01)
  *G06F 17/27*   (2006.01)
  *G06F 17/30*   (2006.01)

(52) U.S. Cl.
  USPC ............... 704/4; 704/5; 704/6; 704/8; 704/9; 707/748

(58) Field of Classification Search
  USPC .......................................... 704/1–9
  See application file for complete search history.

(56) References Cited

U.S. PATENT DOCUMENTS

| 6,014,615 | A  | * | 1/2000  | Chen ................................ 704/3 |
| 6,141,642 | A  |   | 10/2000 | Oh |
| 6,233,546 | B1 | * | 5/2001  | Datig ................................ 704/7 |
| 6,820,055 | B2 | * | 11/2004 | Saindon et al. ............... 704/235 |
| 7,117,231 | B2 | * | 10/2006 | Fischer et al. ........................ 1/1 |
| 2005/0060160 | A1 | * | 3/2005 | Roh et al. ...................... 704/277 |
| 2008/0040095 | A1 | * | 2/2008 | Sinha et al. ...................... 704/2 |

(Continued)

FOREIGN PATENT DOCUMENTS

| JP | 2002-007395    | 1/2002 |
| KR | 10-1999-0001315 | 1/1999 |

(Continued)

OTHER PUBLICATIONS

Yasushi Tsubota et al., "Practical Use of Autonomous English Pronunciation Learning System for Japanese Students," InSTIL/ICALL 2004 Symposium on Computer Assisted Learning, Jun. 17-19, 2004, 5 pages.

*Primary Examiner* — David R Hudspeth
*Assistant Examiner* — Timothy Nguyen
(74) *Attorney, Agent, or Firm* — Staas & Halsey LLP

(57) ABSTRACT

A foreign language writing service method includes: recognizing, when a mixed text of foreign language portions and mother tongue portions is entered by a learner, the mother tongue portions from the mixed text; translating the mother tongue portions; combining a mother tongue translation result with the foreign language portions of the mixed text to generate a combined text; and providing the learner with the combined text of the mother tongue translation result and the foreign language portions of the mixed text.

13 Claims, 3 Drawing Sheets

(56) References Cited

U.S. PATENT DOCUMENTS

| | | |
|---|---|---|
| 2009/0063128 A1* | 3/2009 | Seo et al. ............................ 704/2 |
| 2009/0157380 A1 | 6/2009 | Kim et al. |
| 2009/0210214 A1* | 8/2009 | Qian et al. ......................... 704/2 |
| 2009/0248392 A1* | 10/2009 | Talwar et al. ..................... 704/3 |
| 2009/0326945 A1* | 12/2009 | Tian ............................. 704/254 |
| 2010/0114558 A1* | 5/2010 | Fluhr et al. ........................ 704/5 |
| 2010/0256973 A1* | 10/2010 | Chen et al. ........................ 704/4 |
| 2010/0311030 A1* | 12/2010 | He et al. ........................ 434/350 |
| 2010/0324887 A1* | 12/2010 | Dong et al. ........................ 704/8 |
| 2011/0046940 A1* | 2/2011 | Tanaka et al. ..................... 704/2 |
| 2011/0144974 A1* | 6/2011 | Seo et al. ........................... 704/4 |

FOREIGN PATENT DOCUMENTS

| | | |
|---|---|---|
| KR | 10-0238189 | 10/1999 |
| KR | 10-2002-0011244 | 2/2002 |
| KR | 10-2005-0027298 | 3/2005 |
| KR | 10-2009-0025137 | 3/2009 |
| KR | 10-0911621 | 8/2009 |

* cited by examiner

__US 8,635,060 B2__

FOREIGN LANGUAGE WRITING SERVICE METHOD AND SYSTEM

CROSS-REFERENCE(S) TO RELATED APPLICATION(S)

The present invention claims priority of Korean Patent Application No. 10-2009-0123135, filed on Dec. 11, 2009, which is incorporated herein by reference.

FIELD OF THE INVENTION

The present invention relates to a foreign language writing support service; and, more particularly, to a foreign language writing service method and system, which are suitable to provide the functions of automatic translation, error estimation and error correction of foreign language text written by a learner.

BACKGROUND OF THE INVENTION

Writing in a foreign language is very helpful for learners who want to learn the foreign language. Thus, it is recommended to keep a diary or write an essay in a foreign language in order to improve their foreign language skills.

However, many people are actually reluctant to learn a foreign language in this way due to the following reasons.

One of the biggest reasons is the pressure of feeling they have to prepare a whole text in a foreign language. This kind of pressure will affect much more beginners who are not yet proficient in the foreign language.

In addition, having a tutor capable of correcting foreign language text is quite expensive. In order to improve foreign language skills through writing, it is preferable to have someone find errors in writing and correct them, but you have to pay a lot of money to do so. Thus, it is natural for them to become reluctant to learn a foreign language through writing.

Moreover, a diary or the like is very personal for the most part, so they will not want to disclose their diary to other people. Also, they may feel ashamed to show their foreign language skills to others.

Existing systems for helping with foreign language learning are mostly in connection with the memorization of words or sentences, or correction of a learner's pronunciation. The former system involves a technology for helping with the memorization of words by repetitively showing a foreign language word and the corresponding Korean word, while the latter system involves a language learning technology having the function of recording oneself saying and then comparing their pronunciation with a native speaker's.

In the latter system associated with pronunciation correction, a learner may simply compare his or her pronunciation with a native speaker's, or a computer system itself may find errors in pronunciation and inform a learner of them.

More intelligent learning systems include a dialogue-based system, which allows a learner to improve their foreign language skills by talking to the learning system. This system usually makes a learner have a conversation according to the context of a given scenario. Specifically, the system limits domain to restaurants, trades, and the like, and prompts a learner to have a conversation in limited situations.

SUMMARY OF THE INVENTION

In view of the above, the present invention provides a foreign language writing service method and system which support both a translation function and an error correction function to be a help with foreign language learning while relieving learner's pressure or reluctance resulting from the writing in a foreign language.

Further, the present invention provides a foreign language writing service method and system which provide automated feedback including error estimation and error correction about foreign language texts thereby to allow a learner to easily check their mistakes, learn from these mistakes, and ultimately improve their foreign language skills while lowering psychological/academic entry barriers to the writing in foreign language.

In accordance with a first aspect of the present invention, there is provided a foreign language writing service method, including:

recognizing, when a mixed text of foreign language portions and mother tongue portions is entered by a learner, the mother tongue portions from the mixed text;

translating the mother tongue portions;

combining a mother tongue translation result with the foreign language portions of the mixed text to generate a combined text; and providing the learner with the combined text of the mother tongue translation result and the foreign language portions of the mixed text.

In accordance with a second aspect of the present invention, there is provided a foreign language writing service system, including:

a language input unit for supporting an input of a mixed text of foreign language portions and mother tongue portions by a learner;

a mother tongue translation unit for recognizing the mother tongue portions from the mixed text input through the language input unit, and translating the mother tongue portions;

a combined text generation unit for combining a mother tongue translation result produced by the mother tongue translation unit with foreign language portions of the mixed text to generate a combined text; and a combined text output unit for outputting the combined text generated by the combined text generation unit.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENT

Hereinafter, an embodiment of the present invention will be described in detail with reference to the accompanying drawings which form a part hereof.

Figure 1:
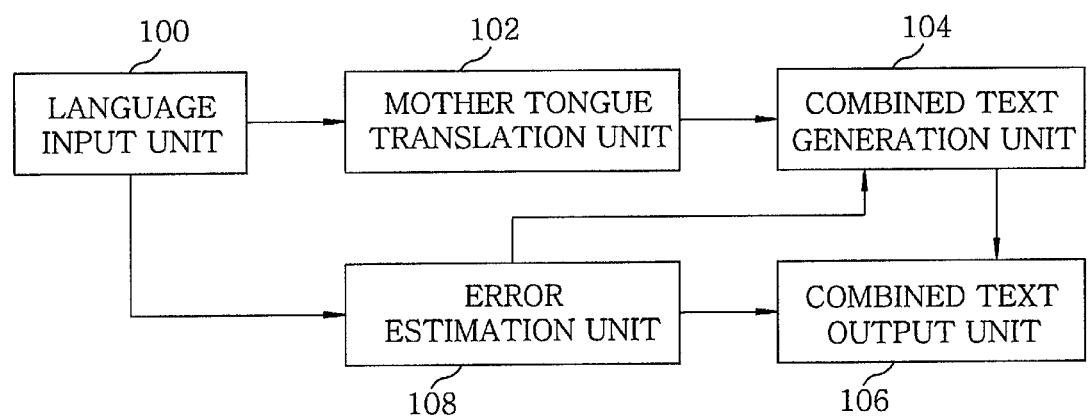
FIG. 1 is a block diagram illustrating a schematic configuration of a foreign language writing service system in accordance with an embodiment of the present invention.

FIG. 1 is a block diagram illustrating a schematic configuration of a foreign language writing service system in accordance with an embodiment of the present invention. The foreign language writing service system includes a language input unit 100, a mother tongue translation unit 102, a combined text generation unit 104, a combined text output unit 106, and an error estimation unit 108.

Referring to FIG. 1, the language input unit 100 enables a learner to enter a mixed text of his/her mother tongue portions and foreign language portions. The mixed text of the mother tongue portions and the foreign language portions (hereinafter, referred to just as a mixed text) is provided to the mother tongue translation unit 102.

The mother tongue translation unit 102 can be implemented, for example, with an automatic translation engine (not shown), and recognizes the mother tongue portions from the mixed text to translate the mother tongue portions. At this time, the mother tongue translation unit 102 proposes at least one translation result.

The combined text generation unit 104 combines the translation result, translated by the mother tongue translation unit 102, with the foreign language portions of the mixed text, in consideration of grammars of the foreign language and the mother tongue. That is, the mother tongue translation result is correctly connected to the foreign language portions of the mixed text without a grammatical error.

The combined text output unit 106 outputs the combined text of the mother tongue translation result and the foreign language portions of the mixed text. The combined text output by the combined text output unit 106 can be shown to the learner through a separate display device (not shown), such as a liquid crystal display (LCD), in the foreign language writing service system.

When the combined text displayed through the display device and composed of only foreign language is re-input to the language input unit 100 by a request of the learner, the error estimation unit 108 estimates an error in the combined text and outputs an error estimation result through the combined text output unit 106.

Upon request from the user to perform correction on the error estimation result, the error estimation unit 108 serves to reflect the details of the request for correction on the combined text and perform correction thereon. The error estimation unit 108 will be described in more detail with reference to FIG. 3.

Now, a foreign language writing service method in accordance with an embodiment of the present invention will be described in detail with reference to FIGS. 2 and 3, in parallel with the above-described configuration.

Figure 2:
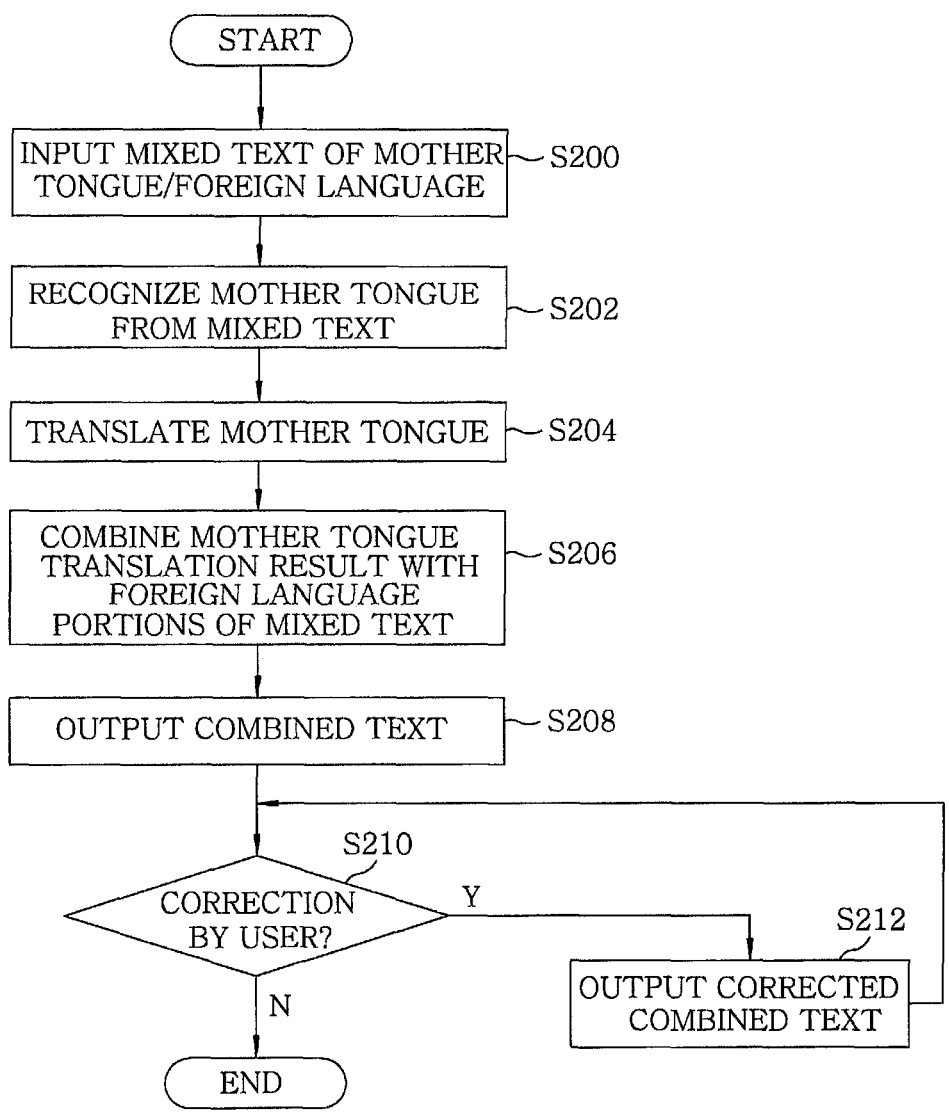
FIG. 2 illustrates a flowchart for explaining a foreign language translation process in accordance with the embodiment of the present invention.

FIG. 2 illustrates a flowchart for explaining a foreign language writing service method, more specifically, a foreign language translation process in accordance with an embodiment of the present invention.

As shown in FIG. 2, in step S200, the language input unit 100 checks whether a mixed text of foreign language portions and mother tongue portions (hereinafter, referred to just as a mixed text), is input by a learner, and upon input of the mixed text, it provides the mixed text to the mother tongue translation unit 102.

Then, the mother tongue translation unit 102 recognizes the mother tongue portions from the mixed text input through the language input unit 100 in step S202, and translates the recognized mother tongue portions into the foreign language in step S204. At this time, the mother tongue translation unit 102 may propose at least one translation result.

Subsequently, in step S206, the combined text generation unit 104 combines the mother tongue translation result with the foreign language portions of the mixed text in consideration of grammars of the foreign language and the mother tongue.

Next, in step S208, the combined text of the mother tongue translation result and the foreign language portions of the mixed text is output through the combined text output unit 106 to be shown to the learner.

Thereafter, it is checked that a request for correction of the combined text is made by the learner in step S210. If there is no request for correction, the process ends. If a request for correction is made, the combined text output unit 106 outputs a combined text reflecting the correction request by learner in step S212.

Figure 3:
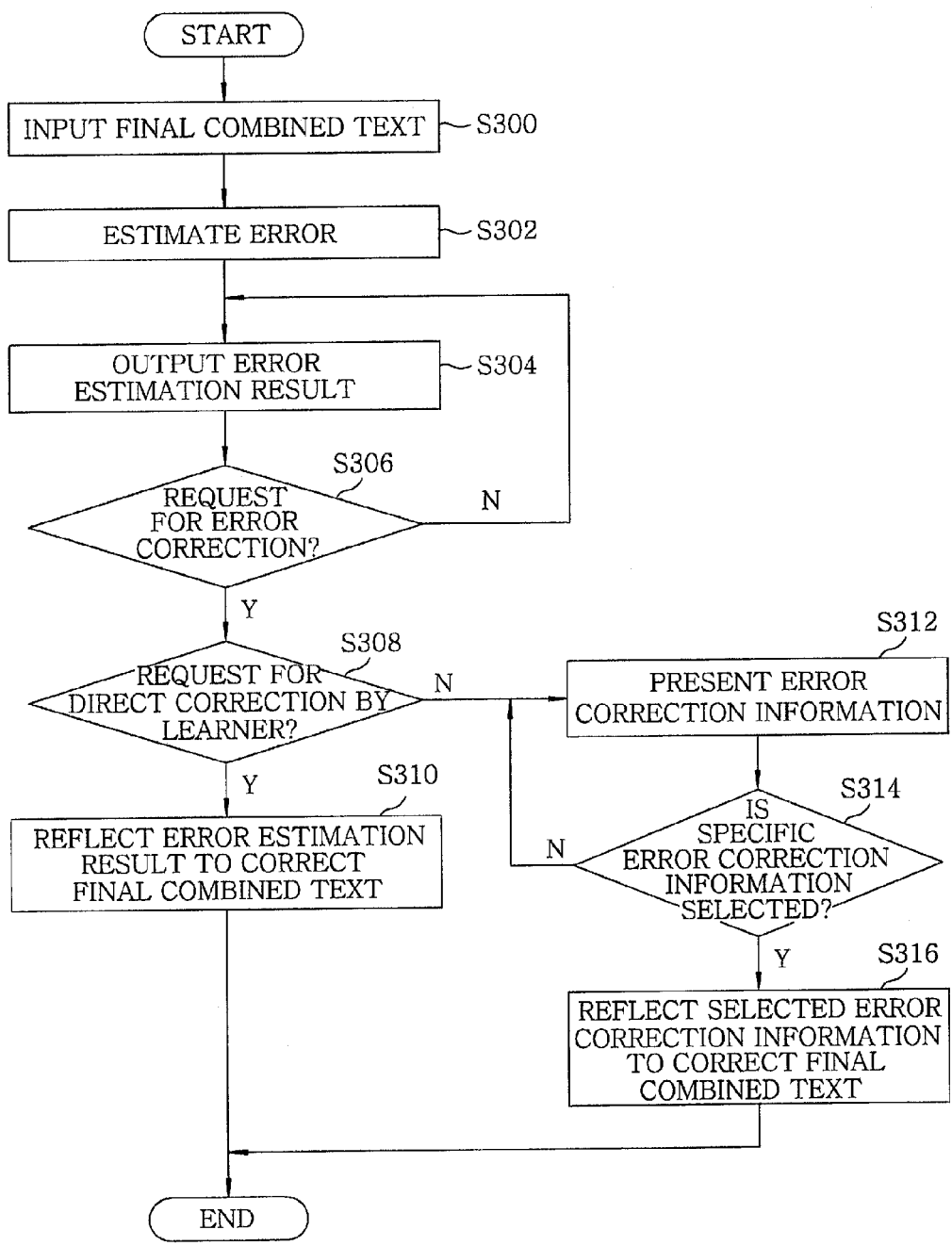
FIG. 3 illustrates a flowchart for explaining an error correction process in accordance with the embodiment of the present invention.

FIG. 3 illustrates a flowchart for explaining a foreign language writing service method, more specifically, a process of correcting errors in a final combined text in accordance with an embodiment of the present invention.

As shown in FIG. 3, when a final combined text provided by the process of FIG. 2 is input through the language input unit 100 by request of a learner, the language input unit 100 provides the corresponding final combined text to the error estimation unit 108 in step S300.

Then, the error estimation unit 108 estimates an error in the final combined text in step S302, and outputs an error estimation result through the combined text output unit 106 in step 304.

Next, when there is a request from the learner to perform correction on the error estimation result in step S306, the error estimation unit 108 determines whether or not the corresponding request is a request for direct correction by the learner in step S308.

If the corresponding request is a request for direct correction by the learner, the error estimation unit 108 reflects the details of the request for correction of the final combined text to output the corrected final combined text through the combined text output unit 106 in step S310.

If the corresponding request is not a request for direct correction by the learner, the error estimation unit 108 provides the learner with error correction information pre-stored in the foreign language writing service system in step S312. This pre-stored error correction information provided by the system may include hints for error correction, such as dictionary information, example sentence information, grammar information, and the like on words/phrases/sentence associated with error correction.

Thereafter, the error estimation unit 108 determines whether or not the learner selects specific error correction information through the language input unit 100 in step S314, and when specific error correction information is selected, the error estimation unit 108 reflects the selected error correction information to revise the final combined text in step S316.

Meanwhile, in this embodiment, it may also be possible to give grades on how much the foreign language text is grammatically correct about each error-corrected text, i.e., revised final combined text and present the grades to the learner.

Hereinafter, there will be illustrated one example of the foreign language writing service in accordance with the embodiment of the present invention, for example, the case to which a foreign language automatic translation function and an error correction function are actually applied. The following example involves the case where, it is assumed that a mother tongue is Korean and a foreign language is English and a diary is written in English that is the foreign language.

First, it is assumed that a text saying "오늘 아침에 나는 매우 일찍 일어났다. 몹시 히기가 졌기 때문이였다." is written in English that is the foreign language. If the learner does not know an English expression for "허기가 졌다", unlike the other parts, the learner can write by mixing Korean (mother tongue) and English (foreign language) as follows:

[Original Mixed Text Written by Learner]
This morning I wake up very early because I very 허기가 졌다.

The foreign language writing service system (hereinafter, referred to as the system) can recognize the part "허기가 졌다" as being a part written in Korean (mother tongue), and present the learner with at least one English (foreign language) translation result of "허기가 졌다" as follows:
[Translation Provided by System]
This morning I wake up very early because I [was very famished; was very hungry]
where the underlined and highlighted text in [ ] is a Korean (mother tongue) translation result and the other text is a foreign language (English) portions. The system may mark up the mother tongue translation result with [ ], underlines, highlights, distinctive color or the like so that the learner can more easily recognize the mother tongue translation result.

The system can provide dictionary information such as words and idioms in the mother tongue translation result when the learner requests. The learner can select an English (foreign language) expression which is considered as the most proper one among the mother tongue translation results or directly enter an English expression by himself/herself in reference to the mother tongue translation results suggested by the system.
[First Corrected Text by Learner]
This morning I wake up very early because I was very hungry.

Translation provided by the system is applicable to words, phrases, and sentences. That is, there are no limits on coverage, and English (foreign language) text portions in the mixed text and Korean (mother tongue) translation result are properly combined to produce a final translation.

From the above example, it can be seen that "very" entered by the learner is properly inserted between "was" and "hungry".

The system may perform translation on a word and provide the learner with translation proposals as follows.
[Original Mixed Text Written by Learner]
I went to the 냉장고, and opend the door.
[Translation Provided by System]
I went to the [refrigerator; freezer], and opend the door.
[First Corrected Text by Learner]
I went to the refrigerator, and opend the door.

In addition, the system can perform translation on a phrase or a clause and provide the learner with translation proposals as follows.
[Original Mixed Text Written by Learner]
But, in the refrigerator, there was not 먹을 것.
[Translation Provided by System]
But, in the refrigerator, there was not [anything to eat; ~~]
[First Corrected Text by Learner]
But, In the refrigerator, there was not anything to eat.

In automatic translation, information of parts near the mother tongue part should be taken into account when performing translation to obtain a correct translation result. In the above example, a sentence containing "먹을 것" is recognized as being a negative sentence, and is not translated into "something to eat" but into "anything to eat".

Meanwhile, the learner may repeatedly enter the same expression in both Korean (the mother tongue) and English (the foreign language). In the following example, the learner wrote "nothing to 먹을 것" and hence a duplication has occurred in the "~ㄹ 것" of "먹을 것" and "nothing to". The automatic translation engine recognizes this duplication and thus translates "먹을 것" not into "anything to eat" but into "eat" only, resulting in the following correct translation.
[Original Text Written by Learner]
But, in the refrigerator, there was nothing to 먹을 것.
[Translation Provided by System]
But, in the refrigerator, there was nothing to [eat; ~~]

Upon completion of writing of a foreign language text, the system checks an error in the final text using an error check function, and provides error estimation information. The system shows the following error estimation result about the following text.
[First Corrected Text by Learner]
This morning I wake up very early because I was hungry.
I went to the refrigerator, and opend the door.
But, In the refrigerator, there was not something to eat.
[Error Estimation Information Provided by System]
This morning I wake up very early because I was hungry.
I went to the refrigerator, and opend the door.
But, In the refrigerator, there was not something to eat.

The learner may correct the errors based on the estimated errors, or, may correct the same by checking correction information provided by the system.
[Second Corrected Text by Learner]
This morning I woke up very early because I was hungry.
I went to the refrigerator, and opened the door.
But, in the refrigerator, there was not something to eat.

These error estimation and correction functions of each sentence can be performed at a point of time desired by the learner. That is, error correction may be performed at every time when the writing of each sentence is completed, or after the writing of all sentences is completed.

As described above, this embodiment is implemented to improve one's foreign language skills by practicing writing in a foreign language using the foreign language writing service system having the function of automatic translation of a word, phrase, or sentence and the function of error estimation and correction. Particularly, the learner can learn a foreign language while practicing writing using both the mother tongue and the foreign language by oneself, without the help of language experts. In addition, the learning effect can be enhanced while relieving difficulties in writing in a foreign language by allowing a learner to use their mother tongue. Moreover, this embodiment will be a great help in the improvement of foreign language skills by easily checking errors in writing and correcting them.

While the invention has been shown and described with respect to the embodiments, it will be understood by those skilled in the art that various changes and modification may be made without departing from the scope of the invention as defined in the following claims.

What is claimed is:
1. A foreign language writing service method, comprising:
    receiving a mixed text of foreign language portions and mother tongue portions entered by a learner;
    recognizing the mother tongue portions from the mixed text;
    translating, using a computer system, the mother tongue portions of the mixed text;
    combining a mother tongue translation result with the foreign language portions of the mixed text to generate a combined text;
    providing the learner with the combined text;
    estimating an error in the combined text;
    outputting an error estimation result;
    determining whether or not there is a request for correction on the error estimation result;

determining whether, if there is a request for correction, the request for correction is a request for direct correction by the learner;

reflecting, if the request for correction is a request for direct correction by the learner, the details of the request for correction on the combined text to revise the combined text;

providing the learner with error correction information, if the request for correction is not a request for direct correction by the learner; and reflecting, when the error correction information is selected by the learner, the selected error correction information to revise the combined text, wherein the error correction information provided by the system includes one or more of dictionary information, example information, and grammar information associated with the error correction, wherein the mother tongue translation result and the foreign language portions of the mixed text are combined in consideration of grammars, grammatical structures of the foreign language portions and the mother tongue portions, and wherein each of the mother tongue translation result portions of the mixed text are marked up with at least one of, underlines, highlights or distinctive color, providing assessment score to the revised combined text in consideration of the grammars of the foreign language text which respect to the correction provided by the system.

2. The method of claim 1, wherein the mother tongue translation result refers to at least one mother tongue translation result.

3. The method of claim 1, wherein the combined text is output to a display device to be provided to the learner.

4. The method of claim 1, wherein the revised combined text is output to a display device to be provided to the learner.

5. The method of claim 1, wherein the mother tongue portions are any one of a word, phrase, and sentence.

6. The method of claim 1, wherein the mother tongue is Korean.

7. The method of claim 1, wherein the foreign language is English.

8. A foreign language writing service system, comprising: a computer system, comprising:
- a language input unit for supporting an input of a mixed text of foreign language portions and mother tongue portions by a learner;
- a mother tongue translation unit for recognizing the mother tongue portions from the mixed text input through the language input unit, and translating the mother tongue portions;
- a combined text generation unit for combining a mother tongue translation result produced by the mother tongue translation unit with foreign language portions of the mixed text to generate a combined text;
- a combined text output unit for outputting the combined text generated by the combined text generation unit; and
- an error estimation unit for estimation an error in the combined text when the combined text is re-input through the language input unit, wherein the error estimation unit determines, when there is a request for correction on the error estimation result, determines whether or not the request is a request for direct correction by the learner, and if the request for correction is a request for direct correction by the learner, reflects details of the request for correction to revise the combined text, and if the request for correction is not a request for direct correction by the learner, provides the learner with error correction information, and when the error correction information is selected by the learner, reflects the selected error correction information to revise the combined text, wherein the error correction information provided by the system includes one or more of dictionary information, example information, and grammar information associated with the error correction, wherein the mother tongue translation result and the foreign language portions of the mixed text are combined in consideration of grammatical structures of the foreign language portions and the mother tongue portions, and wherein each of the mother tongue translation result portions of the mixed text are marked up with at least one of, underlines, highlights or distinctive color, providing assessment score to the revised combined text in consideration of the grammars of the foreign language text which respect to the correction provided by the system.

9. The system of claim 8, wherein the mother tongue portions are any one of a word, phrase, and sentence.

10. The method of claim 1, wherein the mother tongue translation result is distinctively marked when provided so that the learner can see a difference between the mother tongue translation result and the foreign language portions of the mixed text.

11. The method of claim 1, further comprising:
providing alternatives of the mother tongue translation result so that the leaner can select one of the alternatives.

12. The system of claim 8, wherein the mother tongue translation result is distinctively marked when provided so that the learner can see a difference between the mother tongue translation result and the foreign language portions of the mixed text.

13. The system of claim 8, wherein the system provides alternatives of the mother tongue translation result, so that the leaner can select one of the alternatives.

* * * * *